United States Patent
Miwa et al.

(10) Patent No.: US 7,208,199 B2
(45) Date of Patent: Apr. 24, 2007

(54) METHOD OF PROTECTING INDICATED INFORMATION AND CELLULAR STRUCTURE HAVING ITS SURFACE INFORMATION PROTECTED BY THE PROTECTING METHOD

(75) Inventors: Masayoshi Miwa, Nagoya (JP); Masayasu Ishikawa, Nagoya (JP)

(73) Assignee: NGK Insulators, Ltd, Nagoya (JP)

( * ) Notice: Subject to any disclaimer, the term of this patent is extended or adjusted under 35 U.S.C. 154(b) by 149 days.

(21) Appl. No.: 10/506,353

(22) PCT Filed: Feb. 28, 2003

(86) PCT No.: PCT/JP03/02376

§ 371 (c)(1),
(2), (4) Date: Sep. 2, 2004

(87) PCT Pub. No.: WO03/078064

PCT Pub. Date: Sep. 25, 2003

(65) Prior Publication Data

US 2005/0123716 A1    Jun. 9, 2005

(30) Foreign Application Priority Data

Mar. 20, 2002    (JP) ............................. 2002-077821

(51) Int. Cl.
*B05D 1/38*    (2006.01)

(52) U.S. Cl. ...................... 427/266; 427/258; 427/287; 427/243

(58) Field of Classification Search ................ 427/243, 427/266, 258, 287

See application file for complete search history.

(56) References Cited

U.S. PATENT DOCUMENTS

| 4,455,336 A | 6/1984 | Ogawa et al. |
| 2003/0000089 A1 | 1/2003 | Ichikawa et al. |
| 2004/0013582 A1 | 1/2004 | Ichikawa et al. |
| 2005/0100486 A1 | 5/2005 | Ichikawa et al. |

FOREIGN PATENT DOCUMENTS

EP    1 334 795 A1    8/2003

(Continued)

OTHER PUBLICATIONS

Hawleys Condensed Chemical Dictionary, 13$^{th}$ edition, pp. 288-289,1033.*

*Primary Examiner*—Fred J. Parker
(74) *Attorney, Agent, or Firm*—Oliff & Berridge, PLC

(57) ABSTRACT

After displaying information (10) on the surface of an outer wall (4) of a cell structure, a portion surrounding the displayed information (10) is coated with a coating agent to form a region permeated with a coating agent (24) wherein pores (22) of the outer wall (4) are filled with the coating agent in a section of the outer wall (4) on which the information (10) is displayed. The region permeated with a coating agent (24) prevents a catalyst solution from exuding from the inside of the outer wall (4) of the cell structure. According to a method for protecting the displayed information and the cell structure of which surface information is protected by the protection method, a displayed information portion after loading catalyst components is prevented from being colored, and the displayed information can be maintained in a readable state.

10 Claims, 3 Drawing Sheets

FOREIGN PATENT DOCUMENTS

| | | | |
|---|---|---|---|
| EP | 1 350 567 A1 | | 10/2003 |
| JP | 63-168517 | * | 7/1988 |
| JP | A 63-168517 | | 7/1988 |
| JP | A 5-309768 | | 11/1993 |
| JP | 63-168517 | * | 7/1998 |
| JP | 2002-221032 | * | 8/2002 |
| JP | A 2002-221032 | | 8/2002 |
| WO | WO 02/40157 | | 5/2002 |
| WO | WO 02/40216 | | 5/2002 |

* cited by examiner

METHOD OF PROTECTING INDICATED INFORMATION AND CELLULAR STRUCTURE HAVING ITS SURFACE INFORMATION PROTECTED BY THE PROTECTING METHOD

TECHNICAL FIELD

The present invention relates to a method for protecting displayed information and a cell structure whose surface information is protected by the protection method.

BACKGROUND ART

As an assembly for use in applications such as a catalyst converter for use in a chemical reaction apparatus using exhaust gas purification and catalyst functions of an internal combustion engine, a filter, and a heat exchanger, an assembly has been known in which a material of compressive elasticity having a cushioning property is disposed between a cell structure and a cylindrical metal container (can member) and a predetermined compressive surface pressure is applied to the cell structure via the material of compressive elasticity to accommodate and hold (canning) the cell structure in the metal container.

For example, when the assembly is used as the catalyst converter for purifying a car exhaust gas, noble metals such as platinum, palladium, and rhodium are dispersed and loaded as a catalyst component in a ceramic honeycomb structure as one type of the cell structures, and this structure is accommodated and held in the metal container (can member) via a ceramic mat and mounted in an exhaust system.

At this time, when the catalyst components are loaded in the cell structure as described above, a loading amount changes with a weight of the structure. However, in order to control this loading amount, it is necessary to correctly manage the weight of the cell structure in a loading process.

Moreover, the cell structure needs to be accommodated and held in the metal container in an appropriate state. However, since an outer shape dimension of the cell structure is correctly managed in the canning process, even a ceramic honeycomb structure having a large dimensional fluctuation after firing can practically be used without machining/processing an outer periphery of the structure.

Furthermore, the steps for manufacturing, loading, canning, and the like can be traced back and recognized, by checking the lot number of the cell structure marketed after having been mounted in a car.

Therefore, for the cell structure, as shown in FIG. 2, an outer wall 4 has been marked with useful information 10 such as the weight, dimension, characteristics, lot number, and manufacturing conditions.

The information 10 is practically used for smooth and efficient operation of the production line, by reading it visually or mechanically by the users.

When the catalyst is loaded, in general, the catalyst components are not loaded by the outer wall of the honeycomb structure, and therefore the marked displayed information is not buried in the catalyst components. However, when the catalyst is loaded by applying it to the through channels in the cell structure, a solution containing a catalyst exudes to the outer wall of the cell structure by a capillary phenomenon through pores connected to one another, and an information displayed portion on an outer wall surface is also colored. In this case, the information is not easily read. When the information is not uniformly colored or colored in a spotted manner, there is a problem that the information cannot be read in a mechanical read method requiring clearness as in image analysis.

To solve the problem, marking ink has been selected so that the developed color of the displayed information obtains a sufficient contrast with respect to the catalyst solution. However, the information is colored mainly in various brownish colors from dark brown to black in accordance with types or concentrations of the catalyst components. Therefore, it is difficult to handle all the catalyst solutions, and this has been a factor for inhibiting automation of the marking.

The present invention has been developed in consideration of the above-described conventional problems, and an object is to provide a method for protecting displayed information, on which a displayed information portion is prevented from being colored after loading catalyst components and the displayed information can be maintained in a readable state, and a cell structure of which the surface information is protected by the protection method.

DISCLOSURE OF THE INVENTION

According to the present invention, there is provided a method for protecting displayed information, comprising the steps of: displaying information on the surface of an outer wall of a cell structure; and subsequently coating a portion surrounding the displayed information with a coating agent to form a region permeated with a coating agent wherein pores of the outer wall are filled with the coating agent in a section of the outer wall on which the information is displayed, so that the region permeated with a coating agent prevents a catalyst solution from exuding from the inside of the outer wall of the cell structure.

In the present invention, the coating agent is one wherein fine powders are dispersed in a sol form in a liquid.

At this time, a concentration of the fine powder in the coating agent is preferably 50% by weight or less, and the liquid is preferably water or an organic solvent.

Moreover, in the present invention, a particle size of the fine powder is preferably 10 to 30 nm.

At this time, the fine powder preferably comprises one or two or more materials selected from a group consisting of silica, alumina, zirconia, and titania.

Furthermore, in the present invention, the information is preferably displayed in one or two or more display forms selected from a group consisting of characters, barcodes, and two-dimensional codes.

At this time, the information is preferably displayed in one or two or more methods selected from a group consisting of a stamping method, ink jet method, thermal transfer method, and laser baking method. The information is preferably displayed in ink.

It is to be noted that in the present invention the cell structure preferably comprises one of the ceramic material selected from a group consisting of cordierite, alumina, mullite, lithium aluminum silicate, aluminum titanate, titania, zirconia, silicon nitride, aluminum nitride, and silicon carbide or a compound of two or more thereof.

Moreover, according to the present invention, there is provided a cell structure of which surface information is protected by the protection method described above.

BEST MODE FOR CARRYING OUT THE INVENTION

As described above, in a method for protecting displayed information according to the present invention, after displaying information on the surface of an outer wall of a cell structure, a portion surrounding the displayed information is coated with a coating agent. Accordingly, a region permeated with a coating agent wherein pores of the outer wall are filled with the coating agent is formed in a section of the outer wall on which the information is displayed. The region permeated with a coating agent prevents a catalyst solution from exuding from the inside of the outer wall of the cell structure.

Accordingly, after loading catalyst components, a displayed information portion is prevented from being colored, and the displayed information can be maintained in a readable state.

Here, in the present invention, the coating agent is one wherein fine powders are dispersed in a sol form in a liquid.

Figure 3:
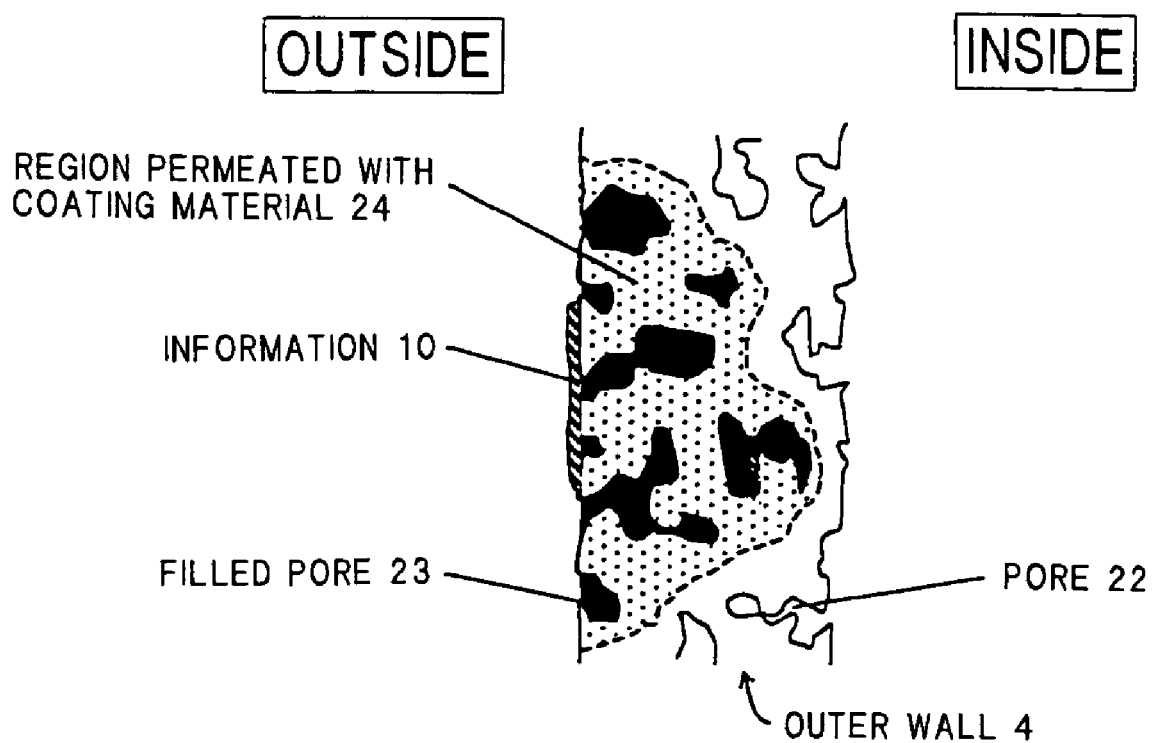
FIG. 3 is an explanatory view showing a state in which an outer wall of the honeycomb structure marked with information in the present invention is coated with a coating agent.

The coating agent is used to coat a portion surrounding marked displayed information 10 in an outer wall 4. As shown in FIG. 3, a region permeated with a coating agent 24 where pores 22 are filled with the coating agent can preferably be formed in a section of the outer wall 4 in the portion surrounding the displayed information 10.

The coating of the coating agent can be carried out by spraying, brushing, dropping, or impregnation.

At this time, in order to promote permeation of fine particles, a concentration of the fine powder in the coating agent is preferably 50% by weight or less. However, since there is such a trouble that the number of the coatings is increased if the concentration of the fine powder is extremely low, the concentration is usually preferably about 10 to 30% by weight.

Furthermore, the shape of the fine powder for use in the present invention should be spherical as much as possible and the particle size thereof is 10 to 30 nm.

This is preferable because the fine powder can easily enter the pores of the outer wall of the cell structure without any hindrance. It is to be noted that the fine powder for use in the present invention is not especially limited, but preferably contains one or two or more materials selected from a group consisting of silica, alumina, zirconia, and titania, and especially silica is preferable.

Moreover, the liquid for use in the present invention is preferably water or organic solvent.

It is to be noted that the organic solvent is not especially limited and, for example, methanol, isopropanol, xylene, n-butanol, methyl ethyl ketone, ethylene glycol, and dimethyl acetamide are preferably appropriately selected and used, but it is more preferable to use alcohols which have little harm.

Figure 2:
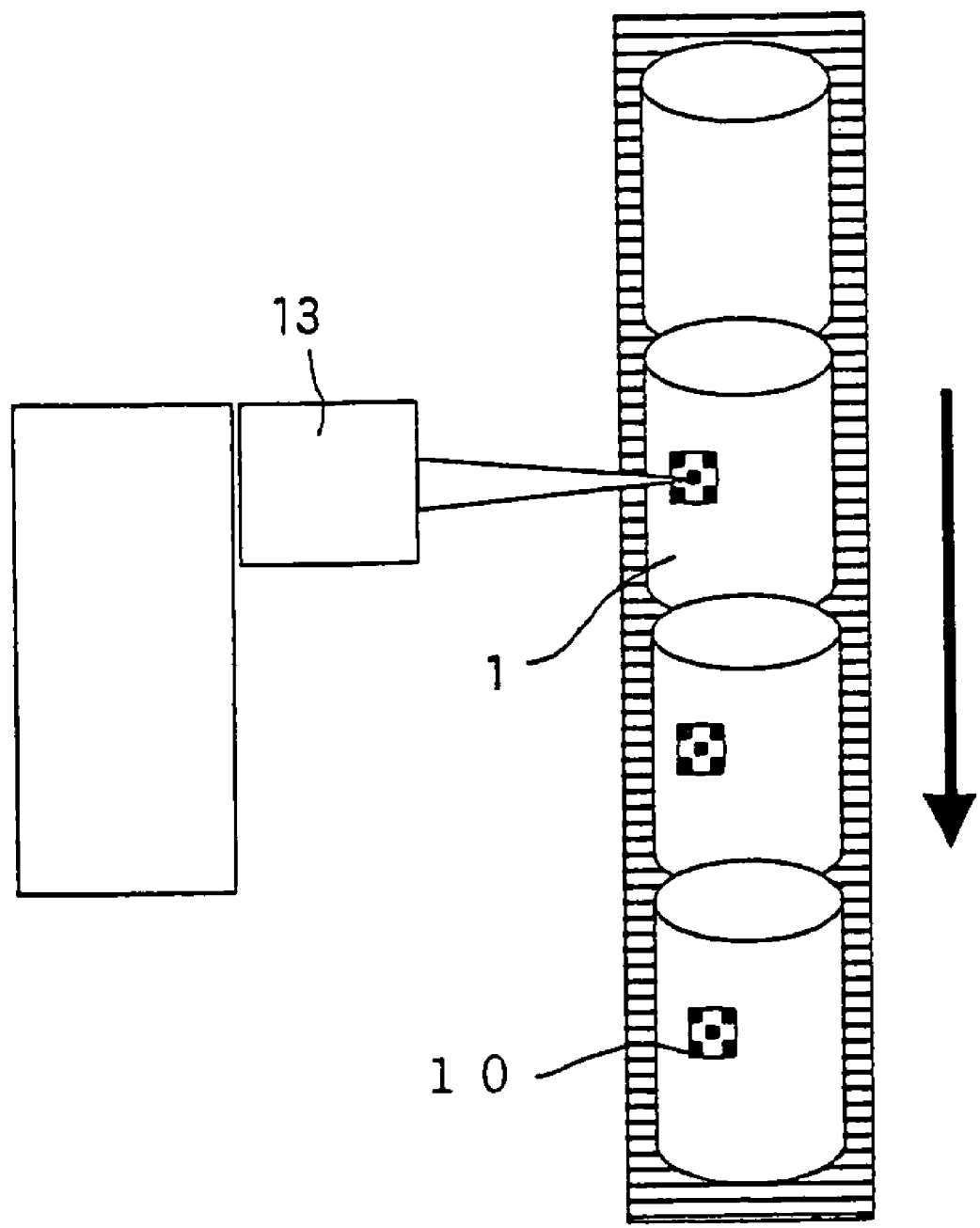
FIG. 2 is an explanatory view showing a marking method of a barcode by an ink jet apparatus.

Here, a display form of the information is not especially limited, but the information is preferably displayed in one or two or more display forms selected from a group consisting of characters, barcodes, and two-dimensional codes (see FIG. 2).

The present invention is not especially limited to a method of displaying the information in ink, and an effect of protecting the displayed information is obtained even in methods such as laser baking.

Also for these methods of displaying the information, two types of methods can be combined for use. For example, it is also possible to combine and use both the display methods including an ink jet method or a thermal transfer method and a stamping method. When the information is displayed by ink, two types of ink such as heat resistant ink and non-heat resistant ink may also be combined for use if necessary.

Moreover, it is preferable to use heat resistant ink when the information is displayed in the ink after loading the catalyst components, since the baking is carried out by subjecting to a heat treatment at about 400 to 800° C.

Furthermore, since the catalyst components are generally loaded on a substrate in the form of an aqueous solution, the ink preferably has water resistance.

Figure 1A:
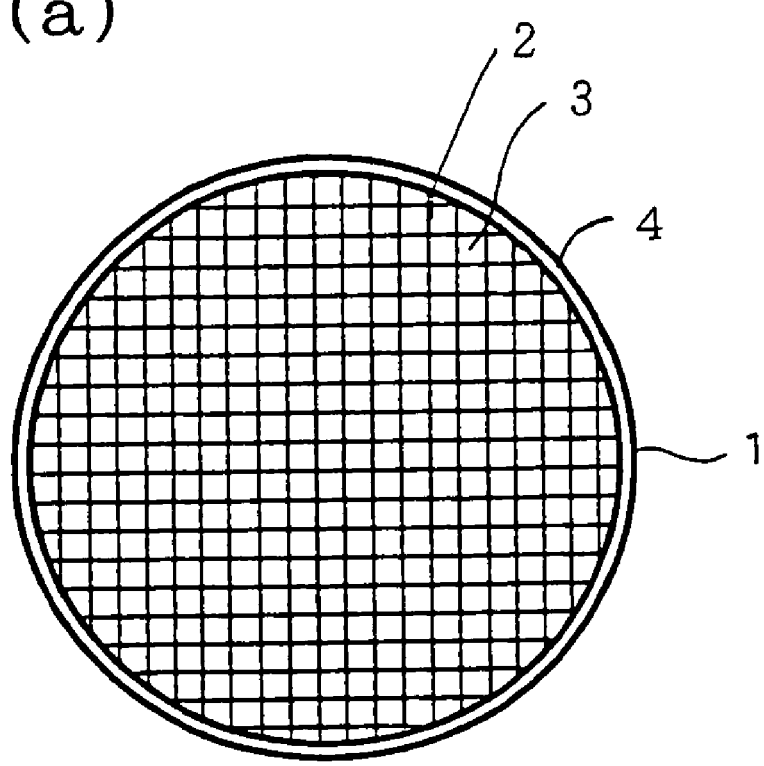
FIGS. 1(a), (b) are explanatory views showing a honeycomb structure for use in a cell structure according to an embodiment, (a) is a plan view, and (b) is a perspective view.
Figure 1B:
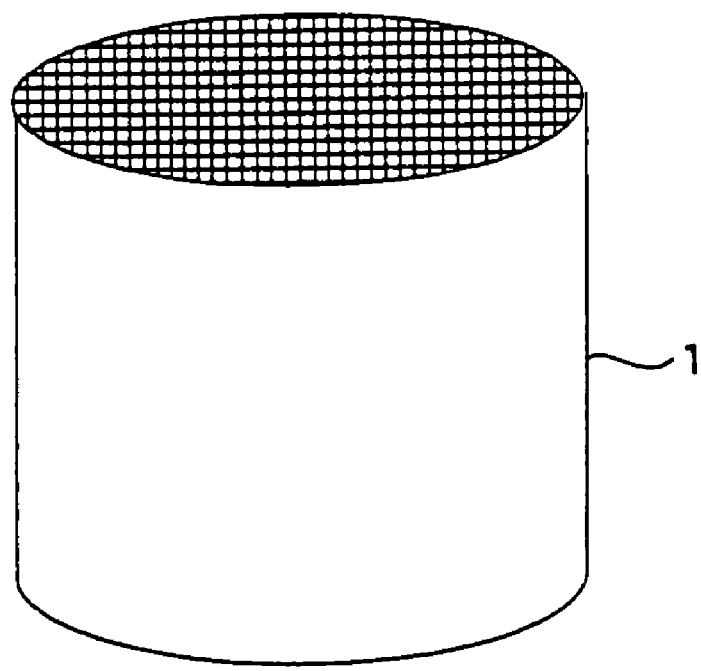

For example, as shown in FIGS. 1(a), (b), the cell structure is preferably a honeycomb structure which includes a plurality of cell passages 3 formed by a plurality of partition walls 2 and in which a cell partition wall thickness is 0.11 mm or less and an open frontal area ratio is 85% or more.

Moreover, the honeycomb structure includes the outer wall 4 forming outer-diameter contour around the structure, and the thickness of the outer wall is preferably at least 0.05 mm.

Furthermore, as the cell structure for use in the present invention, in addition to the honeycomb structure, a foam structure may also be used.

It is to be noted that the cell structure for use in the present invention preferably contains one or two or more of ceramic materials selected from a group consisting of cordierite, alumina, mullite, lithium aluminum silicate, aluminum titanate, titania, zirconia, silicon nitride, aluminum nitride, and silicon carbide or of a compound thereof. The adsorption material selected from a group consisting of active carbon, silica gel, and zeolite can also preferably be used for the cell structure.

Moreover, as to the cell shape for the honeycomb structure formed by extrusion molding, there are triangular, quadrangular, hexagonal, and round shaped cells. In general, the structure having square shaped cells as one of quadrangular shaped cells is frequently used. However, in recent years, the use of the honeycomb structure having hexagonal shaped cells has also spread.

The present invention will further be described hereinafter in detail based on examples, but the present invention is not limited to these examples.

EXAMPLES 1 TO 12, COMPARATIVE EXAMPLES 1 TO 5

After measuring an outer diameter of a cordierite honeycomb structure (2 mil partition wall, cell density of 900 cpsi, nominal outer diameter of φ106 mm, length of 114 mm) with a measurement apparatus, as shown in FIG. 2, a honeycomb structure 1 discharged from the measurement apparatus was next sent to an ink jet apparatus 13, and the outer surface of the honeycomb structure 1 was marked with a barcode based on the information simultaneously sent.

At this time, examples of conditions for the marking by ink jet are as follows.

Example of Ink Jet

Ink Jet Apparatus:
 Emerge Co. S4 Plus

Type of Ink:
 Heat resistant ink (dark brown at room temperature, orange after the heat treatment)

Form of Information Laid on the Honeycomb Structure:
 Numeric characters

Information Laid on the Honeycomb Structure:
 Average outer-diameter of the honeycomb structure by actual measurement (strikethrough: and actual measurement mass value)

After the printing on these conditions, a frame larger in length and breadth than the marked information by about 5 mm was prepared, and the coating agent shown in Table 1 was used in the frame to apply the coating (twice) (see FIG. 3). After the catalyst components were loaded by the honeycomb structure, it was checked if it was possible to recognize the information by image analysis. As Comparative Example 1, an uncoated sample was used.

impossible to recognize the information by image analysis, and the character recognition rate was about 45%.

Furthermore, in Comparative Examples 2 to 5, since the particle size of the fine powder in the coating agent was excessively large, it was impossible to charge the fine particles into pores in the outer wall well, the information was colored, and the character recognition rate by image analysis was 47 to 55%.

INDUSTRIAL APPLICABILITY

In a method for protecting displayed information and a cell structure of which surface information is protected by the protection method according to the present invention, a displayed information portion is prevented from being colored after loading catalyst components, and the displayed information can be maintained in a readable state.

The invention claimed is:

1. A method for protecting displayed information, comprising the steps of: displaying information on a surface of an outer wall of a cell structure; and subsequently coating a portion of the outer wall surrounding the displayed information with a coating agent to form a region permeated with the coating agent wherein pores of the outer wall are filled

TABLE 1

|  | Material of fine powder | Particle size (nm) | Particle shape | Solution [solvent] | Concentration of fine powder (wt %) | Catalyst solution exudation preventive effect | By image treatment Character distinction rate (%) | Matching rate (%) |
|---|---|---|---|---|---|---|---|---|
| Example 1 | Silica | 10–20 | Spherical | Water | 10 | Good | 98 | 88 |
| Example 2 | Silica | 10–20 | Spherical | Water | 20 | Satisfactory | 100 | 99 |
| Example 3 | Silica | 10–20 | Spherical | Water | 40 | Good | 96 | 83 |
| Example 4 | Silica | 10–20 | Spherical | Methanol | 30 | Satisfactory | 100 | 98 |
| Example 5 | Silica | 20–30 | Spherical | Methanol | 40 | Satisfactory | 100 | 95 |
| Example 6 | Silica | 10–20 | Spherical | Methyl ethyl ketone | 30 | Satisfactory | 100 | 97 |
| Example 7 | Silica | 10–20 | Spherical | Ethylene glycol | 20 | Satisfactory | 100 | 97 |
| Example 8 | Silica | 10–20 | Spherical | Dimethyl acetamide | 20 | Satisfactory | 100 | 96 |
| Example 9 | Silica | 10–20 | Spherical | Isopropanol | 30 | Satisfactory | 100 | 97 |
| Example 10 | Silica | 10–20 | Spherical | Xylene-n-butanol | 30 | Satisfactory | 100 | 95 |
| Example 11 | Alumina | 10–20 | Bar-shaped | Water | 20 | Good | 95 | 81 |
| Example 12 | Silica | 10–20 | Spherical | Water | 50 | Satisfactory | 50 | 30 |
| Comparative Example 1 | — | — | — | — | — | — | 45 | 30 |
| Comparative Example 2 | Alumina | 100 × 10 | Feathery | Water | 10 | Disapproved | 48 | 29 |
| Comparative Example 3 | Magnesia | 250–350 | Particulate | Water | 20 | Disapproved | 51 | 30 |
| Comparative Example 4 | Titania | 100 | Spherical | Water | 20 | Disapproved | 47 | 28 |
| Comparative Example 5 | Zirconia | 50 | Spherical | Water | 20 | Disapproved | 55 | 31 |

From results of Table 1, in any of Examples 1 to 12, the catalyst was not permeated in the outer wall marked with the information in a process for loading by catalyst solution, therefore the information clearly remained, and a character recognition rate by image analysis was 95% or more.

On the other hand, in Comparative Example 1, especially for the information colored in the spotted form, it was with the coating agent in a section of the outer wall on which the information is displayed, so that the region permeated with the coating agent prevents a catalyst solution from exuding from the inside of the outer wall of the cell structure, wherein the coating agent contains a powder dispersed in a sol form in a liquid, a particle size of the powder being in a range of 10 to 30 nm.

2. The method for protecting the displayed information according to claim 1, wherein a concentration of the powder in the coating agent is 50% by weight or less.

3. The method for protecting the displayed information according to claim 1, wherein the liquid is water or organic solvent.

4. The method for protecting the displayed information according to claim 1, wherein the information is displayed in at least one display form selected from the group consisting of display forms of the information such as characters, barcodes, and two-dimensional codes.

5. The method for protecting the displayed information according to claim 1, wherein the information is displayed in at least one method selected from the group consisting of a stamping method, ink jet method, thermal transfer method, and laser baking method.

6. The method for protecting the displayed information according to claim 1, wherein the information is displayed in ink.

7. The method for protecting the displayed information according to claim 1, wherein the cell structure comprises at least one ceramic material selected from the group consisting of cordierite, alumina, mullite, lithium aluminum silicate, aluminum titanate, titania, zirconia, silicon nitride, aluminum nitride, and silicon carbide.

8. The method for protecting the displayed information according to claim 1, the powder comprising at least one material selected from the group consisting of silica, alumina, zirconia, and titania.

9. The method for protecting the displayed information according to claim 1, wherein the coating step comprises at least two repeated applications of the coating agent to the portion of the outer wall surrounding the displayed information.

10. A method for protecting displayed information, comprising the steps of: displaying information on a surface of an outer wall of a cell structure: and subsequently coating a portion of the outer wall surrounding the displayed information with a coating agent to form a region permeated with the coating agent wherein pores of the outer wall are filled with the coating agent in a section of the outer wall on which the information is displayed, so that the region permeated with the coating agent prevents a catalyst solution from exuding from the inside of the outer wall of the cell structure, wherein the coating agent contains a powder dispersed in a sol form in a liquid, the powder comprising at least one material selected from the group consisting of silica, alumina, zirconia, and titania.

* * * * *